United States Patent
Kim et al.

(10) Patent No.: US 8,923,329 B2
(45) Date of Patent: Dec. 30, 2014

(54) APPARATUS AND METHOD FOR SUPPORTING VARIOUS SYSTEM BANDWIDTHS IN A BROADBAND WIRELESS COMMUNICATION SYSTEM

(75) Inventors: Tae-Young Kim, Seongnam-si (KR); Sung-Eun Park, Seoul (KR); Chi-Woo Lim, Suwon-si (KR); Ho-Kyu Choi, Seongnam-si (KR); Jae-Weon Cho, Seongnam-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 875 days.

(21) Appl. No.: 12/806,363

(22) Filed: Aug. 11, 2010

(65) Prior Publication Data

US 2011/0261677 A1 Oct. 27, 2011

(30) Foreign Application Priority Data

Apr. 27, 2010 (KR) ........................ 10-2010-0038872

(51) Int. Cl.
| | |
|---|---|
| *H04J 3/16* | (2006.01) |
| *H04L 27/26* | (2006.01) |
| *H04L 5/00* | (2006.01) |
| *H04W 72/04* | (2009.01) |

(52) U.S. Cl.
CPC ........ *H04L 27/2656* (2013.01); *H04L 27/2666* (2013.01); *H04L 5/003* (2013.01); *H04L 5/0007* (2013.01); *H04W 72/0493* (2013.01); *H04W 72/0453* (2013.01)
USPC .......................... 370/468; 455/452.1; 709/226

(58) Field of Classification Search
None
See application file for complete search history.

(56) References Cited

U.S. PATENT DOCUMENTS

2009/0067522 A1\* 3/2009 Kwak et al. ................... 375/260
2010/0103896 A1\* 4/2010 Cho et al. ...................... 370/329

OTHER PUBLICATIONS

Japanese Office Action dated Jan. 28, 2014 in connection with Japanese Patent Application No. 2010-105252, 6 pages.
Chiwoo Lim et al., "Proposed Changes to Advanced Preamble design for supporting tone dropping (15.3.6.1)", IEEE 802.16 Broadband Wireless Access Working Group, Nov. 17, 2009, IEEE C802.16m-09/2418, 5 pages.
William Hillery et al., Correction of OFDMA Parameter Table for Tone Dropping with an FFT size of 1024 (Sections 16.3.2.4), IEEE 802.16 Broadband Wireless Access Working Group, Dec. 31, 2009, IEEE C802.16m-09/3048, 3 pages.
Debdeep Chatterjee et al., Proposed Signaling Overhead reduction and Text Refinements to Sections 15.3.5 (Downlink Physical Structure) of IEEE 802.16m AWD "clean-up version"—AWD-IMDG, IEEE 802.16 Broadband Wireless Access Working Group, Jun. 15, 2009, IEEE C802.16m-09/1205r7, 27 pages.

\* cited by examiner

*Primary Examiner* — Khoa Huynh

(57) ABSTRACT

An apparatus and method support various system bandwidths in a broadband wireless communication system. A Mobile Station (MS) operation includes determining a system bandwidth through a primary preamble for frame synchronization, which a Base Station (BS) transmits. A Fast Fourier Transform (FFT) size, the number of guard subcarriers, and the number of used subcarriers corresponding to the system bandwidth are determined using a first table. An operation parameter of a modem is set according to the FFT size, the number of guard subcarriers, and the number of used subcarriers.

36 Claims, 6 Drawing Sheets

APPARATUS AND METHOD FOR SUPPORTING VARIOUS SYSTEM BANDWIDTHS IN A BROADBAND WIRELESS COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Apr. 27, 2010 and assigned Serial No. 10-2010-0038872, the entire disclosure of which is hereby incorporated by reference.

TECHNICAL FIELD OF THE INVENTION

The present invention relates to a broadband wireless communication system. More particularly, the present invention relates to an apparatus and method for supporting various system bandwidths in a broadband wireless communication system.

BACKGROUND OF THE INVENTION

In order to provide services, wireless communication systems have to use a constant range of frequency bands. Because the frequency bands are rare resources, it cannot be guaranteed that a bandwidth of a desired size is provided anytime, anywhere. Further, the size of a required system bandwidth varies according to each country, according to a service provider's intention. However, the system standard does not define various system bandwidths enough to meet all the requirements of a system bandwidth. This is because predefining various system bandwidths is accompanied by many difficulties owing to the uncertainty of a required system bandwidth. Thus, there is a need for an alternative for, without an increase of system complexity and without a reduction of system transmission efficiency, flexibly supporting various system bandwidths required by service providers in addition to a basic definition of a system bandwidth.

SUMMARY OF THE INVENTION

To address the above-discussed deficiencies of the prior art, it is a primary aspect of the present invention to provide an apparatus and method for supporting various system bandwidths in a broadband wireless communication system.

Another aspect of the present invention is to provide an apparatus and method for determining the number of guard subcarriers optimized to a system bandwidth in a broadband wireless communication system.

A further aspect of the present invention is to provide an apparatus and method for determining a frequency partition rate optimized to a system bandwidth in a broadband wireless communication system.

The above aspects are achieved by providing an apparatus and method for supporting various system bandwidths in a broadband wireless communication system.

According to one aspect of the present invention, a method for system bandwidth management of a Mobile Station (MS) in a broadband wireless communication system is provided. The method includes determining a system bandwidth through a primary preamble for frame synchronization, which a Base Station (BS) transmits. A Fast Fourier Transform (FFT) size, the number of guard subcarriers, and the number of used subcarriers corresponding to the system bandwidth are determined using a first table. An operation parameter of a modem is set according to the FFT size, the number of guard subcarriers, and the number of used subcarriers.

According to another aspect of the present invention, a method for system bandwidth management of a BS in a broadband wireless communication system is provided. The method includes determining an FFT size, the number of guard subcarriers, and the number of used subcarriers corresponding to the system bandwidth using a first table. An operation parameter of a modem is set according to the FFT size, the number of guard subcarriers, and the number of used subcarriers.

According to a further aspect of the present invention, an MS apparatus in a broadband wireless communication system is provided. The apparatus includes a detector, a controller, and a storage unit. The detector detects a primary preamble for frame synchronization, which a BS transmits. The controller determines a system bandwidth through the primary preamble, determines an FFT size, the number of guard subcarriers, and the number of used subcarriers corresponding to the system bandwidth using a first table, and sets an operation parameter of a modem according to the FFT size, the number of guard subcarriers, and the number of used subcarriers. The storage unit stores the first table, which defines FFT sizes, the numbers of guard subcarriers, and the numbers of used subcarriers corresponding to a plurality of system bandwidth ranges, and classifies the plurality of system bandwidth ranges on a basis of the number of sub-bands corresponding to the number of used subcarriers.

According to a yet another aspect of the present invention, a BS apparatus in a broadband wireless communication system is provided. The apparatus includes a controller and a storage unit. The controller determines an FFT size, the number of guard subcarriers, and the number of used subcarriers corresponding to a system bandwidth using a first table, and sets an operation parameter of a modem according to the FFT size, the number of guard subcarriers, and the number of used subcarriers. The storage unit stores the first table, which defines FFT sizes, the numbers of guard subcarriers, and the numbers of used subcarriers corresponding to a plurality of system bandwidth ranges, and classifies the plurality of system bandwidth ranges on a basis of the number of sub-bands corresponding to the number of used subcarriers.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

A technology for supporting various system bandwidths in a broadband wireless communication system according to an embodiment of the present invention is described below. In the present invention below, an Orthogonal Frequency Division Multiplexing/Orthogonal Frequency Division Multiple Access (OFDM/OFDMA) wireless communication system is described, for example.

Figure 1:
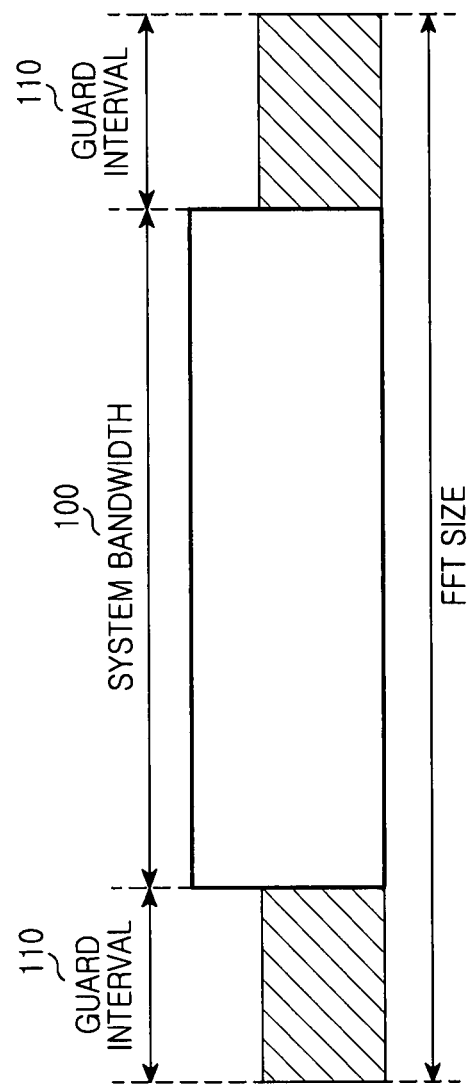
FIG. 1 illustrates a system bandwidth of a broadband wireless communication system according to an embodiment of the present invention.

FIG. 1 illustrates a system bandwidth of a broadband wireless communication system according to an embodiment of the present invention.

Referring to FIG. 1, in order to support a required system bandwidth 100, the present invention uses a Fast Fourier Transform (FFT) size greater than the system bandwidth 100 to be actually allocated. The number of guard subcarriers included in guard intervals 110 positioned at both ends of the system bandwidth 100 is dynamically controlled. The guard subcarriers represent subcarriers not used due to transmit signal power attenuation. The transmit signal power attenuation takes place at both sides of the system bandwidth 100 due to spectrum masking for reducing interference in a signal transmitted in an adjacent band. If the guard intervals 110 get wider, i.e., if the number of guard subcarriers increases, system transmission efficiency is deteriorated because of a decrease of the number of subcarriers used for actual data transmission. Thus, it is desirable for the system to allocate as few guard subcarriers as possible but enough to maintain a transmit signal power when being allocated a bandwidth used for data transmission.

For example, it is assumed that, when using an FFT size of '2048', a system Bandwidth (BW) occupies twenty ('20') MHz. At this time, when a specific service provider owns fourteen ('14') MHz system bandwidth and requests to support the fourteen ('14') MHz system bandwidth, the system according to the embodiment of the present invention uses the same sampling frequency and FFT size as when supporting the system bandwidth of twenty ('20') MHz. However, the system controls the number of guard subcarriers of both sides of the system bandwidth of fourteen ('14') MHz such that data is transmitted only at an effective system bandwidth size, i.e., at the system bandwidth of fourteen ('14') MHz.

For the sake of bandwidth optimization through the control of the number of guard subcarriers as above, the number of the usable subcarriers and the number of guard subcarriers at both sides are predefined by FFT size, according to a required system bandwidth range. Table 1 below shows one example of, for an FFT size of '2048', defining the number of the whole usable subcarriers and the number of guard subcarriers on both sides according to a system bandwidth range. At this time, a used sampling frequency can be equal to '22.4' MHz. In Table 1 below, the defined system bandwidth range is limited to ten ('10') MHz to twenty ('20') MHz, and, the number of the whole usable subcarriers includes the number of Direct Current (DC) subcarriers. Also, a Physical Resource Unit (PRU) represents a basic resource unit comprised of eighteen physically continued subcarriers and six OFDMA symbols.

TABLE 1

| BW region, x | Number of guard subcarriers | | Number of used | Number of |
|---|---|---|---|---|
| (MHz) | Left | Right | subcarriers | PRUs |
| 20.0 > x ≥ 19.2 | 196 | 195 | 1657 | 92 |
| 19.2 > x ≥ 18.4 | 232 | 231 | 1585 | 88 |
| 18.4 > x ≥ 17.5 | 268 | 267 | 1513 | 84 |
| 17.5 > x ≥ 16.7 | 304 | 303 | 1441 | 80 |
| 16.7 > x ≥ 15.9 | 340 | 339 | 1369 | 76 |
| 15.9 > x ≥ 15.0 | 376 | 375 | 1297 | 72 |
| 15.0 > x ≥ 14.2 | 412 | 411 | 1225 | 68 |
| 14.2 > x ≥ 13.4 | 448 | 447 | 1153 | 64 |
| 13.4 > x ≥ 12.5 | 484 | 483 | 1081 | 60 |
| 12.5 > x ≥ 11.7 | 520 | 519 | 1009 | 56 |
| 11.7 > x ≥ 10.9 | 556 | 555 | 937 | 52 |
| 10.9 > x > 10.0 | 592 | 591 | 865 | 48 |

Table 2 below shows one example of, for an FFT/IFFT size of '1024', defining the number of the whole usable subcarriers and the number of guard intervals at both sides according to a system bandwidth range. At this time, a used sampling frequency can be equal to '11.2' MHz. In Table 2, the defined system bandwidth range is limited to five ('5') MHz to ten ('10') MHz.

TABLE 2

| BW region, x | Number of guard subcarriers | | Number of used | Number of |
|---|---|---|---|---|
| (MHz) | Left | Right | subcarriers | PRUs |
| 10.0 > x ≥ 9.2 | 116 | 115 | 793 | 44 |
| 9.2 > x ≥ 8.4 | 152 | 151 | 721 | 40 |
| 8.4 > x ≥ 7.5 | 188 | 187 | 649 | 36 |
| 7.5 > x ≥ 6.7 | 224 | 223 | 577 | 32 |
| 6.7 > x ≥ 5.9 | 260 | 259 | 505 | 28 |
| 5.9 > x > 5.0 | 296 | 295 | 433 | 24 |

In Tables 1 and 2 above, the number of the whole usable subcarriers and the number of guard subcarriers determined according to the system bandwidth range are defined by the following rule.

First, the number of guard subcarriers has to be determined as a sufficiently necessary number considering a spectrum mask. However, it is desirable to allocate as few guard subcarriers as possible considering system transmission efficiency. For example, in the second row of Table 2 above, a rate of a bandwidth occupied by actually allocated subcarriers compared to a system bandwidth is between 0.856 and 0.9375. That is, the number of subcarriers has to be allocated less than 0.95 to the minimum considering the spectrum mask. In order to minimize a decrease of the system transmission efficiency, a system bandwidth range and the number of guard subcarriers are determined such that the number of subcarriers can be allocated more than 0.85.

Second, the minimum difference of the number of subcarriers between adjacent rows is determined to be a unit of sub-band. Here, the sub-band is a unit of resource for using for the purpose of band Adaptive Modulation and Coding (AMC), and is defined as a bundle of adjacent subcarriers. For example, the sub-band is a bundle of four PRUs. In order to support the band AMC of the sub-band unit, a resource allocation scheme of the sub-band unit is used. According to this, in order to prevent a change of the resource allocation scheme, a difference of the number of used subcarriers between adjacent rows in Tables 1 and 2 above is one sub-band.

A Mobile Station (MS) according to an embodiment of the present invention stores information such as Tables 1 and 2. Thus, the MS judges an FFT size and the number of used subcarriers according to a system bandwidth used by a Base Station (BS) and, according to this, the MS controls a range of subcarriers to map/demap a signal. At this time, the system bandwidth information is acquired through a primary preamble transmitted by the BS. The primary preamble is a signal comprised of a predefined sequence for frame synchronization, and is periodically transmitted. A value of the sequence represents a system bandwidth. After judging the number of used subcarriers from the system bandwidth information, the MS can decode a secondary preamble and a Superframe Header (SFH) on the basis of the system bandwidth information. The secondary preamble is a signal comprised of a BS's own sequence for BS distinction, and is a signal occupying the whole system bandwidth. The SFH is a broadcasting message, which includes system setting information necessary for accessing the BS.

Figure 2:
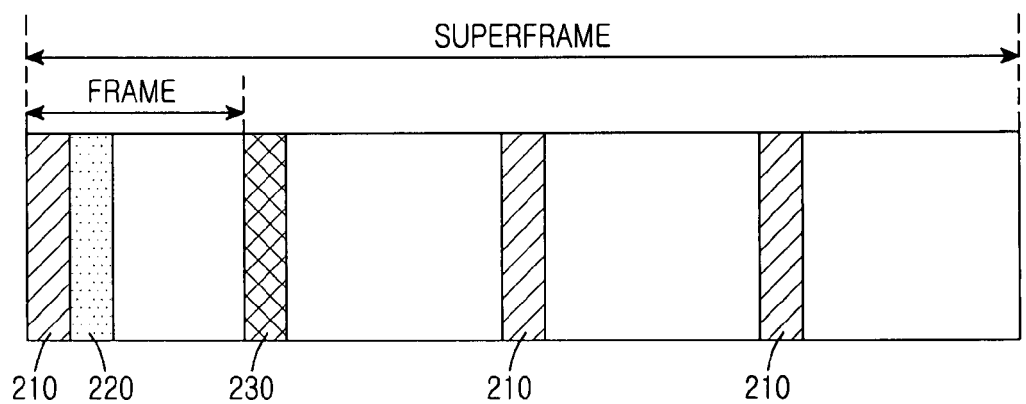
FIG. 2 illustrates transmission cycles of a preamble and a SuperFrame Header (SFH) in a broadband wireless communication system according to an embodiment of the present invention.
Figure 2:
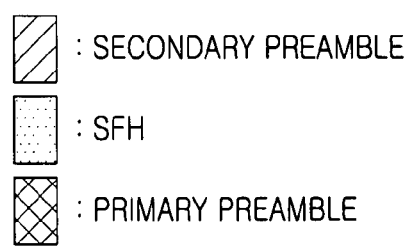

The primary preamble, the secondary preamble, and the SFH are periodically transmitted. For example, the primary preamble, the secondary preamble, and the SFH can be transmitted in a cycle as illustrated in FIG. 2. Referring to FIG. 2, a superframe includes four frames, and secondary preambles 210 are transmitted at start portions of the first, third, and fourth frames. An SFH 220 is transmitted at the first frame after the secondary preamble 210, and a primary preamble 230 is transmitted at a start portion of the second frame.

The secondary preamble occupies the whole system bandwidth. Thus, the secondary preamble is adjusted to a corresponding system bandwidth according to a tone dropping technique. That is, the secondary preamble is defined as a sequence based on a reference system bandwidth, and the sequence is divided into a plurality of sub-blocks. Thus, the secondary preamble is adjusted to the corresponding system bandwidth by expanding or reducing in a unit of sub-block. An example of a structure of the secondary preamble according to a range of a system bandwidth is shown in Table 3 below.

TABLE 3

| System bandwidth (MHz) | Number of sub-blocks | Sub-block allocated |
|---|---|---|
| 5 < x < 6.25 | 8 | ABCD EFGH |
| 6.25 ≤ x < 7.5 | 10 | H ABCD EFGH A |
| 7.5 ≤ x < 8.75 | 12 | GH ABCD EFGH AB |
| 8.75 ≤ x < 10 | 14 | FGH ABCD EFGH ABC |
| 10 ≤ x < 11.25 | 16 | EFGH ABCD EFGH ABCD |
| 11.25 ≤ x < 12.5 | 18 | D EFGH ABCD EFGH ABCD E |
| 12.5 ≤ x < 13.75 | 20 | CD EFGH ABCD EFGH ABCD EF |
| 13.75 ≤ x < 15 | 22 | BCD EFGH ABCD EFGH ABCD EFG |
| 15 ≤ x < 16.25 | 24 | ABCD EFGH ABCD EFGH ABCD EFGH |
| 16.25 ≤ x < 17.5 | 26 | H ABCD EFGH ABCD EFGH ABCD EFGH A |
| 17.5 ≤ x < 18.75 | 28 | GH ABCD EFGH ABCD EFGH ABCD EFGH AB |
| 18.75 ≤ x < 20 | 30 | FGH ABCD EFGH ABCD EFGH ABCD EFGH ABC |

The primary preamble and the number of used subcarriers, which is acquired through Tables 1 and 2, are used at the time of allocating frequency resources. Particularly, when intending to operate a Fractional Frequency Reuse (FFR), the MS and the BS have to divide a frequency partition. At this time, a rate between necessary frequency partitions becomes different according to user distribution and channel environment. In general, rates of several representative situations are predefined and selectively operated. If various system bandwidths are supported according to the present invention, each Frequency Partition Size (FPS) does not exactly match with a predefined Frequency Partition (FP) rate. For example, when the number of the whole subcarriers other than DC subcarriers is equal to '1368' and a frequency partition rate ($FP_0:FP_1:FP_2:FP_3$) is equal to 0:1:1:1, the 1368 subcarriers are not accurately divided into three equal parts. Here, the 'FPi' represents an $i^{th}$ frequency partition. Thus, when the subcarriers are not divided into an integer number, it is desirable to approximate the frequency partition rate using a 'floor( )' operation.

Tables 4 and 5 below represent one example of an FPS approximated when FFT/IFFT sizes are equal to '2048' and '1024', respectively.

TABLE 4

| $FP_0:FP_1:FP_2:FP_3$ | Number of PRUs at $i^{th}$ frequency partition | |
|---|---|---|
| | $FPS_0$ | $FPS_i$ (i > 0) |
| 1:0:0:0 | $N_{PRU}$ | 0 |
| 0:1:1:1 | 0 | $FPS_1 = N_{PRU} - 2*floor(N_{PRU}/3)$ |
| | | $FPS_2 = floor(N_{PRU}/3)$ |
| | | $FPS_3 = floor(N_{PRU}/3)$ |
| 1:1:1:1 | $N_{PRU} - 3*floor(N_{PRU}/4)$ | $floor(N_{PRU}/4)$ |
| 3:1:1:1 | $N_{PRU} - 3*floor(N_{PRU}/6)$ | $floor(N_{PRU}/6)$ |
| 5:1:1:1 | $N_{PRU} - 3*floor(N_{PRU}/8)$ | $floor(N_{PRU}/8)$ |
| 9:1:1:1 | $N_{PRU} - 3*floor(N_{PRU}/12)$ | $floor(N_{PRU}/12)$ |
| 9:5:5:5 | $N_{PRU} - 3*floor(N_{PRU}*5/24)$ | $floor(N_{PRU}*5/24)$ |

TABLE 5

| $FP_0:FP_1:FP_2:FP_3$ | Number of PRUs at $i^{th}$ frequency partition | |
|---|---|---|
| | $FPS_0$ | $FPS_i$(i > 0) |
| 1:0:0:0 | $N_{PRU}$ | 0 |
| 0:1:1:1 | 0 | $FPS_1 = N_{PRU} - 2*floor(N_{PRU}/3)$ |
| | | $FPS_2 = floor(N_{PRU}/3)$ |
| | | $FPS_3 = floor(N_{PRU}/3)$ |
| 1:1:1:1 | $N_{PRU} - 3*floor(N_{PRU}/4)$ | $floor(N_{PRU}/4)$ |
| 3:1:1:1 | $N_{PRU} - 3*floor(N_{PRU}/6)$ | $floor(N_{PRU}/6)$ |
| 5:1:1:1 | $N_{PRU} - 3*floor(N_{PRU}/8)$ | $floor(N_{PRU}/8)$ |
| 9:5:5:5 | $N_{PRU} - 3*floor(N_{PRU}*5/24)$ | $floor(N_{PRU}*5/24)$ |

As shown in Tables 4 and 5 above, various system bandwidths are supported and therefore, the FPS is determined using the 'floor( )' operation. In Tables 4 and 5 above, the '$N_{PRU}$' represents the number of usable PRUs determined from the number of used subcarriers determined in Table 1 or 2 above. Also, the '$FPS_i$' represents the number of PRUs allocated to an $i^{th}$ frequency partition ($FP_i$), and the '$FPS_0$' represents a band of a reuse-1.

Constructions and operations of a BS and an MS for supporting various system bandwidths according to the present invention are described below in detail with reference to the accompanying drawings.

Figure 3:
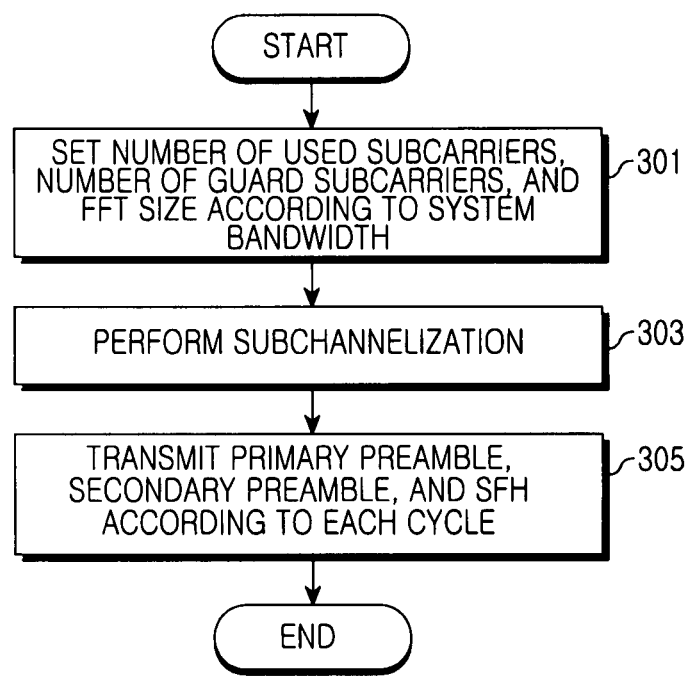
FIG. 3 illustrates an operation process of a Base Station (BS) in a broadband wireless communication system according to an embodiment of the present invention.

FIG. 3 illustrates an operation process of a BS in a broadband wireless communication system according to an embodiment of the present invention.

Referring to FIG. 3, in block 301, the BS sets the number of used subcarriers, the number of guard subcarriers, and an FFT size according to a system bandwidth. The BS stores a table defining FFT sizes, the numbers of guard subcarriers, and the numbers of used subcarriers corresponding to a plurality of system bandwidth ranges. From the table, the BS identifies values corresponding to a range to which the system bandwidth belongs, sets an FFT size as identified, and determines a range of guard subcarriers and a range of data load subcarriers among the whole subcarriers. In other words, the BS sets an operation parameter of a modulator/demodulator (modem) according to the FFT size, the number of guard subcarriers, and the number of used subcarriers. In the table, the plurality of system bandwidth ranges are classified on a basis of the number of sub-bands corresponding to the number of used subcarriers. For example, the table includes Tables 1 and 2.

After that, the BS proceeds to block 303 and performs subchannelization. That is, in order to support an FFR, the BS determines the number of frequency partitions and a size rate of frequency partitions and, according to the number of frequency partitions and the size rate of frequency partitions, partitions used subcarriers into a plurality of frequency partitions. That is, from Tables 4 and 5, the BS identifies the system bandwidth, and frequency partition size values equivalent to the number of frequency partitions and the size rate of frequency partitions, and partitions used subcarriers into respective frequency partitions as identified. At this time, the frequency partition size value is expressed by an expression that includes, as a variable, at least one of the number of partitions and the number of PRUs, which is determined from the number of used subcarriers. Thus, the BS substitutes at least one of the number of partitions and the number of PRUs to calculate the sizes of respective frequency partitions. At this time, the frequency partition configurations different from each other in uplink and downlink can be applied.

Next, the BS proceeds to block 305 and, according to each cycle, transmits a primary preamble, a secondary preamble, and an SFH while performing communication. For example, the primary preamble, the secondary preamble, and the SFH can be transmitted at a time point as illustrated in FIG. 2. The BS generates the primary preamble using a sequence representing the system bandwidth and periodically transmits the primary preamble. Also, the BS generates the secondary preamble comprised of a BS's own sequence. The BS adjusts the size of the secondary preamble to the system bandwidth according to a tone dropping technique and periodically transmits the secondary preamble. Also, the BS generates the SFH including system setting information and periodically transmits the SFH. Here, the SFH includes a parameter that indicates a frequency partition configuration for an FFR. For example, the parameter indicating the frequency partition configuration can be designated as a Downlink Frequency Partition Configuration/Uplink Frequency Partition Configuration (DFPC/UFPC). When the FFR is applied, the BS selects one of various FFR patterns and, according to the selected FFR pattern, the BS boosts a power level of one frequency partition. Here, the FFR pattern can be changed according to a judgment of the BS or a request of the MS.

Figure 4:
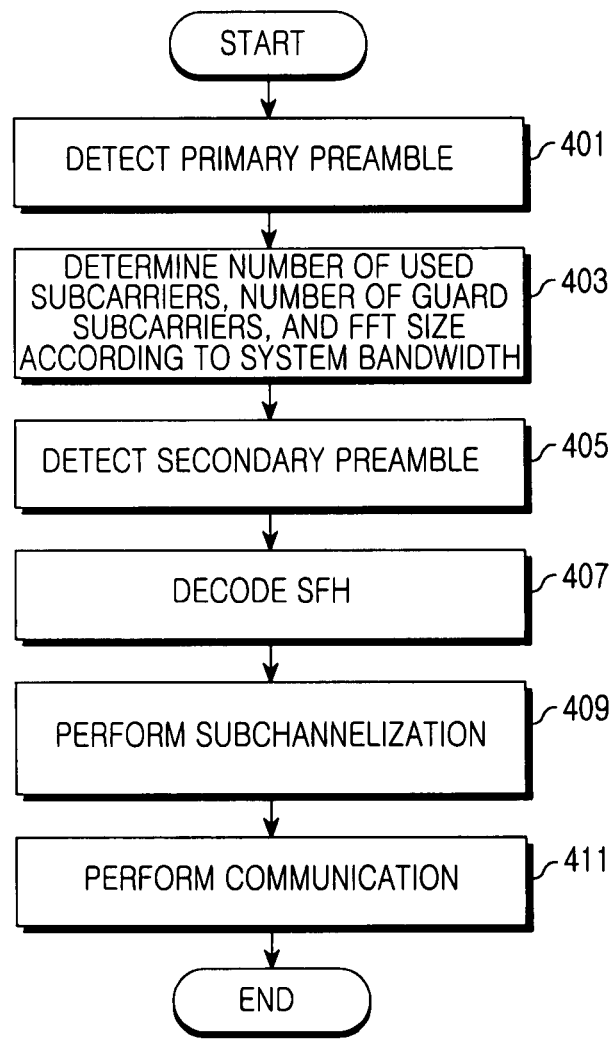
FIG. 4 illustrates an operation process of a Mobile Station (MS) in a broadband wireless communication system according to an embodiment of the present invention.

FIG. 4 illustrates an operation process of an MS in a broadband wireless communication system according to an embodiment of the present invention.

Referring to FIG. 4, in block 401, the MS detects a primary preamble. The primary preamble is periodically transmitted according to a predefined time interval. For example, the primary preamble is transmitted at a time point as illustrated in FIG. 2. Thus, the MS can perform a correlation operation for two OFDMA symbols spaced apart by the predefined time interval and detect the primary preamble using the correlation operation result. Due to this, the MS can acquire frame synchronization with a BS, and be aware of a system bandwidth used by the BS. That is, the MS can be aware of the system bandwidth by identifying a sequence constituting the primary preamble.

After that, the MS proceeds to block 403 and determines the number of used subcarriers, the number of guard subcarriers, and an FFT size according to a system bandwidth identified through the primary preamble. The MS stores a table defining HT sizes, the numbers of guard subcarriers, and the numbers of used subcarriers corresponding to a plurality of system bandwidth ranges. In the table, the MS identifies values corresponding to a range to which the system bandwidth belongs, sets an FFT size as identified, and determines a range of guard subcarriers and a range of data load subcarriers among the whole subcarriers. In other words, the MS sets an operation parameter of a modem according to the FFT size, the number of guard subcarriers, and the number of used subcarriers. In the table, the plurality of system bandwidth ranges are classified on a basis of the number of sub-bands corresponding to the number of used subcarriers. For example, the table includes Tables 1 and 2.

After that, the MS proceeds to block 405 and detects a secondary preamble. Because the MS has acquired frame synchronization through the primary preamble, the MS can be aware of a position where the secondary preamble is received. According to this, the MS distinguishes BSs by detecting the secondary preamble. For example, the secondary preamble is transmitted at a time point as illustrated in FIG. 2.

Next, the MS proceeds to block 407 and receives and decodes an SFH. Because the MS has acquired frame synchronization through the primary preamble, the MS can be aware of a position where the SFH is received. Accordingly, the MS acquires system setting information for accessing a BS by decoding the SFH. Here, the SFH includes a parameter that indicates a frequency partition configuration for an FFR. For example, the parameter indicating the frequency partition configuration can be designated as a DFPC/UFPC. For example, the SFH is transmitted at a time point as illustrated in FIG. 2.

After that, the MS proceeds to block 409 and performs subchannelization. In other words, the MS partitions used subcarriers into a plurality of frequency partitions according to a frequency partition configuration (i.e., the number of frequency partitions and a size rate of frequency partitions) identified through the SFH. From Tables 4 and 5, the MS identifies the system bandwidth, frequency partition size values equivalent to the number of frequency partitions, and the size rate of frequency partitions, and partitions used subcarriers into respective frequency partitions as identified. At this time, the frequency partition size value is expressed by an expression that includes, as a variable, at least one of the number of partitions and the number of PRUs, which is determined from the number of used subcarriers. Accordingly, the MS substitutes at least one of the number of partitions and the number of PRUs to calculate the size of each of frequency partitions. At this time, the frequency partition configuration different from each other in uplink and downlink can be applied.

After that, the MS proceeds to block 411 and performs communication with a BS according to the FFT size set in block 403, the range of subcarriers, and the subchannels set in block 409. When the FFR is applied, the MS can measure channel qualities for frequency partitions of a reuse-K (K>1) and then, according to the channel quality of each frequency partition, send to the BS a request for a preferable frequency partition. Here, the channel quality can be a Carrier to Interference and Noise Ratio (CINR), a Signal to Interference and Noise Ratio (SINR), a Spectral Efficiency (SE), a data rate, and such.

Figure 5:
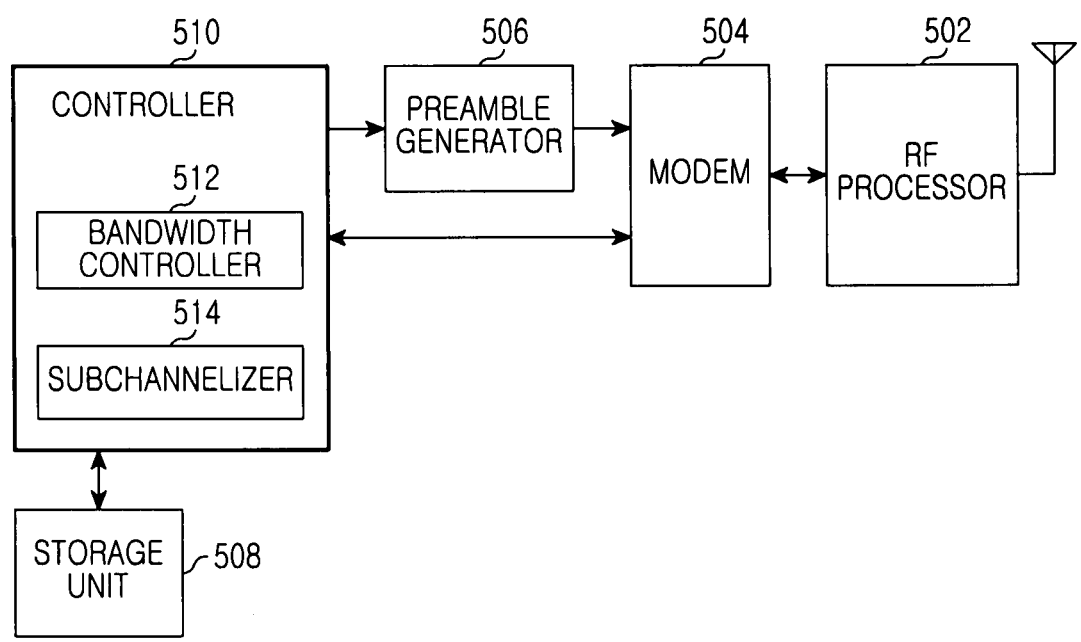
FIG. 5 illustrates a construction of a BS in a broadband wireless communication system according to an embodiment of the present invention.

FIG. 5 illustrates a construction of a BS in a broadband wireless communication system according to an embodiment of the present invention.

Referring to FIG. 5, the BS includes a Radio Frequency (RF) processor 502, a modem 504, a preamble generator 506, a storage unit 508, and a controller 510.

The RF processor 502 performs a function for transmitting/receiving a signal through a wireless channel, such as signal band conversion, amplification, and such. That is, the RF processor 502 up-converts a baseband signal provided from the modem 504 into an RF band signal and transmits the RF band signal through an antenna. Also, the RF processor 502 down-converts an RF band signal received through the antenna into a baseband signal.

The modem 504 performs a function of conversion between a baseband signal and a bit stream according to the standard of a physical layer of a system. For example, at data transmission, the modem 504 generates complex symbols by encoding and modulating a transmission bit stream, maps the complex symbols to subcarriers, and then constructs OFDM symbols through Inverse Fast Fourier Transform (IFFT) operation and Cyclic Prefix (CP) insertion. Also, at data reception, the modem 504 partitions a baseband signal provided from the RF processor 502 in a unit of OFDM symbol, restores signals mapped to subcarriers through FFT operation, and then restores a reception bit stream through demodulation and decoding.

At this time, the modem 504 is notified of an FFT size, the number of used subcarriers, and the number of guard subcarriers from the controller 510. According to the notified values from the controller 510, the modem 504 performs FFT/IFFT operation and symbol mapping/demapping. According to each cycle, the modem 504 transmits a primary preamble and secondary preamble provided from the preamble generator 506 and an SFH provided from the controller 510. For example, the primary preamble, the secondary preamble, and the SFH can be transmitted at a time point as illustrated in FIG. 2.

The preamble generator 506 generates and provides the primary preamble and the secondary preamble to the modem 504. A sequence constituting the primary preamble and secondary preamble is provided from the controller 510. The preamble generator 506 generates the primary preamble using a sequence representing a system bandwidth used by the BS, and generates the secondary preamble comprised of a BS's own sequence. At this time, the preamble generator 506 adjusts the size of the secondary preamble to the system bandwidth according to a tone dropping technique.

The storage unit 508 stores a program necessary for an operation of the BS, setting information, and such. Particularly, the storage unit 508 stores a table showing the number of guard subcarriers and the number of used subcarriers according to a system bandwidth, and a table showing a frequency partition configuration according to the system bandwidth. For example, the tables can be constructed as shown in Tables 1, 2, 4, and 5.

The controller 510 controls a general operation of the BS. For example, the controller 510 generates a control message transmitted to MSs, and analyzes a control message received from an MS, and allocates resources to the MSs. Also, the controller 510 provides a sequence constituting the primary preamble and secondary preamble to the preamble generator 506. Also, the controller 510 collects system setting information and generates an SFH. At this time, the SFH includes a parameter of informing a frequency partition configuration for an FFR. For instance, the parameter of informing the frequency partition configuration can be designated as a DFPC/UFPC. When the FFR is applied, the controller 510 selects one of multiple FFR patterns and, according to the selected FFR pattern, the controller 510 boosts a power level of one frequency partition. Here, the FFR pattern can be changed according to a judgment of the BS or a request of the MS.

Particularly, a bandwidth controller 512 included in the controller 510 sets the number of used subcarriers, the number of guard subcarriers, and an FFT size according to a system bandwidth. In other words, from a table showing the number of guard subcarriers and the number of used subcarriers according to a system bandwidth stored in the storage unit 508, the bandwidth controller 512 identifies values corresponding to a range to which the system bandwidth belongs, sets an FFT size as identified, and determines a range of guard subcarriers and a range of data load subcarriers among the whole subcarriers. And, the controller 510 notifies the modem 504 of the FFT size, the range of guard subcarriers, and the range of data load subcarriers.

A subchannelizer 514 included in the controller 510 performs subchannelization according to the system bandwidth. In other words, in order to support an FFR, the subchannelizer 514 partitions used subcarriers into a plurality of frequency partitions according to the number of frequency partitions and a size rate of frequency partitions. In a table showing a frequency partition configuration according to a system bandwidth stored in the storage unit 508, the subchannelizer 514 identifies the system bandwidth, and frequency partition size values equivalent to the number of frequency partitions and the size rate of frequency partitions, and partitions used subcarriers into respective frequency partitions as identified. At this time, the frequency partition size value is expressed by an expression that includes, as a variable, at least one of the number of partitions and the number of PRUs, which is determined from the number of used subcarriers. Accordingly, the subchannelizer 514 substitutes at least one of the number of PRUs and the number of PRUs to calculate the size of each of frequency partitions. At this time, the frequency partition configuration different from each other in uplink and downlink can be applied.

Figure 6:
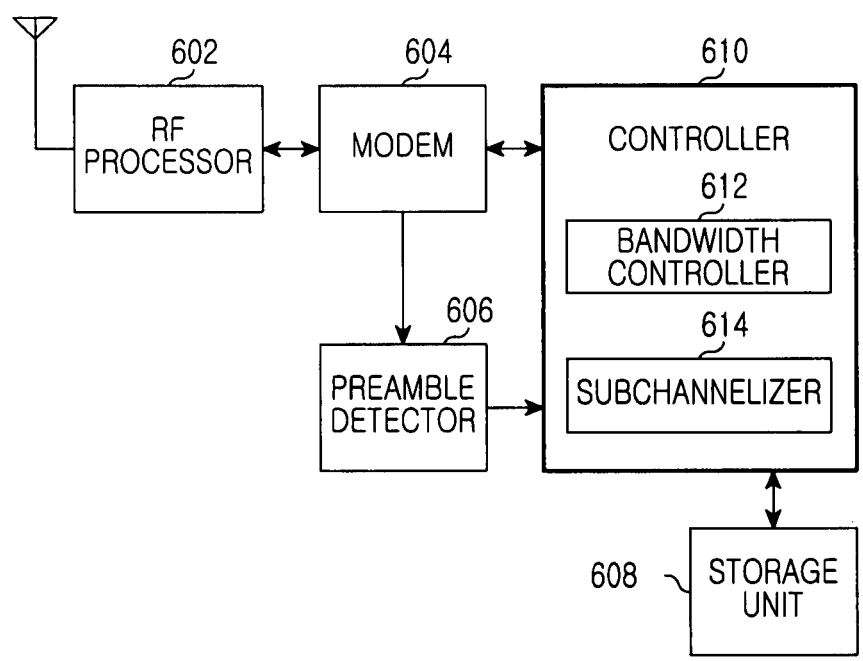
FIG. 6 illustrates a construction of an MS in a broadband wireless communication system according to an embodiment of the present invention.

FIG. 6 illustrates a construction of an MS in a broadband wireless communication system according to an embodiment of the present invention.

Referring to FIG. 6, the MS includes an RF processor 602, a modem 604, a preamble detector 606, a storage unit 608, and a controller 610.

The RF processor 602 performs a function for transmitting/receiving a signal through a wireless channel, such as signal band conversion, amplification, and such. That is, the RF processor 602 up-converts a baseband signal provided from the modem 604 into an RF band signal and transmits the RF band signal through an antenna. Also, the RF processor 602 down-converts an RF band signal received through the antenna into a baseband signal.

The modem 604 performs a function of conversion between a baseband signal and a bit stream according to the standard of a physical layer of a system. For example, at data transmission, the modem 604 generates complex symbols by encoding and modulating a transmission bit stream, maps the complex symbols to subcarriers, and then constructs OFDM symbols through IFFT operation and CP insertion. Also, at data reception, the modem 604 divides a baseband signal provided from the RF processor 602 in a unit of OFDM symbol, restores signals mapped to subcarriers through FFT operation, and then restores a reception bit stream through demodulation and decoding. At this time, the modem 604 is notified of an FFT size, the number of used subcarriers, and the number of guard subcarriers from the controller 610. According to the notified values from the controller 610, the modem 604 performs FFT/IFFT operation and symbol mapping/demapping.

The preamble detector 606 detects a primary preamble and secondary preamble received from a BS. The primary preamble is periodically transmitted according to a predefined time interval. For example, the primary preamble is transmitted at a time point as illustrated in FIG. 2. Thus, the preamble detector 606 can perform a correlation operation for two OFDMA symbols spaced the predefined time interval apart, and detect the primary preamble using the correlation operation result. After that, the preamble detector 606 distinguishes BSs by detecting the secondary preamble. The preamble detector 606 also provides a sequence constituting the primary preamble and a sequence constituting the secondary preamble to the controller 614.

The storage unit 608 stores a program necessary for an operation of the MS, setting information, and such. Particularly, the storage unit 608 stores a table showing the number of guard subcarriers and the number of used subcarriers according to a system bandwidth, and a table showing a frequency partition configuration according to the system bandwidth. For example, the tables can be constructed as shown in Tables 1, 2, 4, and 5.

The controller 610 controls a general operation of the MS. For example, the controller 610 generates a control message transmitted to a BS, and analyzes a control message received from the BS. Particularly, the controller 610 identifies a system bandwidth through a sequence constituting the primary preamble provided from the preamble detector 606, and distinguishes BSs through a sequence constituting the secondary preamble. The controller 610 also acquires system setting information for accessing the BS through an SFH received from the BS. Here, the system setting information includes frequency partition configuration information for an FFR.

A bandwidth controller 612 included in the controller 610 sets the number of used subcarriers, the number of guard subcarriers, and an FFT size according to a system bandwidth identified through a sequence constituting the primary preamble. In other words, from a table showing the number of guard subcarriers and the number of used subcarriers according to a system bandwidth stored in the storage unit 608, the bandwidth controller 612 identifies values corresponding to a range to which the system bandwidth belongs, sets an FFT size as identified, and determines a range of guard subcarriers and a range of data load subcarriers among the whole subcarriers. The controller 610 also notifies the modem 604 of the FFT size, the range of guard subcarriers, and the range of data load subcarriers. That is, the controller 610 sets an operation parameter of the modem 504 according to the FFT size, the number of guard subcarriers, and the number of used subcarriers.

A subchannelizer 614 included in the controller 610 performs subchannelization according to the system bandwidth. In other words, in order to support an FFR, the subchannelizer 614 partitions used subcarriers into a plurality of frequency partitions according to the number of frequency partitions and a size rate of frequency partitions. From a table showing frequency partition configuration according to a system bandwidth stored in the storage unit 608, the subchannelizer 614 identifies the system bandwidth, and frequency partition size values equivalent to the number of frequency partitions and the size rate of frequency partitions, and partitions used subcarriers into respective frequency partitions as identified. At this time, the frequency partition size value is expressed by an expression that includes, as a variable, at least one of the number of partitions and the number of PRUs, which is determined from the number of used subcarriers. Accordingly; the subchannelizer 614 substitutes at least one of the number of PRUs and the number of PRUs to calculate the size of each of frequency partitions. At this time, the frequency partition configuration different from each other in uplink and downlink can be applied.

An embodiment of the present invention can build a system capable of supporting various system bandwidths, by defining an FFT size, the number of guard subcarriers, and the number of used subcarriers for a plurality of system bandwidth ranges in a broadband wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for system bandwidth management of a Mobile Station (MS) in a wireless communication system, the method comprising:
   determining, by the MS, a system bandwidth based on a primary preamble for frame synchronization, which a Base Station (BS) transmits;
   determining, by the MS, a number of guard subcarriers and a number of used subcarriers based on a Fast Fourier Transform (FFT) size and a bandwidth range among a plurality of bandwidth ranges divided between at least two channel bandwidths, and corresponding to the system bandwidth using a first table; and
   setting, by the MS, an operation parameter of a modem according to the FFT size, the number of guard subcarriers, and the number of used subcarriers,
   wherein the first table defines the number of guard subcarriers, and the number of used subcarriers according to the plurality of bandwidth ranges and the FFT size, and wherein the plurality of bandwidth ranges are classified based on a number of sub-bands corresponding to the number of used subcarriers.

2. The method of claim 1, wherein the first table comprises a table below:

| BW region, x (MHz) | Number of guard subcarriers Left | Number of guard subcarriers Right | Number of used subcarriers | Number of Physical Resource Units (PRUs) |
|---|---|---|---|---|
| 20.0 > x ≥ 19.2 | 196 | 195 | 1657 | 92 |
| 19.2 > x ≥ 18.4 | 232 | 231 | 1585 | 88 |
| 18.4 > x ≥ 17.5 | 268 | 267 | 1513 | 84 |
| 17.5 > x ≥ 16.7 | 304 | 303 | 1441 | 80 |
| 16.7 > x ≥ 15.9 | 340 | 339 | 1369 | 76 |
| 15.9 > x ≥ 15.0 | 376 | 375 | 1297 | 72 |
| 15.0 > x ≥ 14.2 | 412 | 411 | 1225 | 68 |
| 14.2 > x ≥ 13.4 | 448 | 447 | 1153 | 64 |
| 13.4 > x ≥ 12.5 | 484 | 483 | 1081 | 60 |
| 12.5 > x ≥ 11.7 | 520 | 519 | 1009 | 56 |
| 11.7 > x ≥ 10.9 | 556 | 555 | 937 | 52 |
| 10.9 > x > 10.0 | 592 | 591 | 865 | 48, | and wherein, when the system bandwidth belongs to one of ranges defined in the table above, the PP 1 size is equal to '2048'.

3. The method of claim 1, wherein the first table comprises a table below:

| BW region, x (MHz) | Number of guard subcarriers Left | Number of guard subcarriers Right | Number of used subcarriers | Number of Physical Resource Units (PRUs) |
|---|---|---|---|---|
| 10.0 > x ≥ 9.2 | 116 | 115 | 793 | 44 |
| 9.2 > x ≥ 8.4 | 152 | 151 | 721 | 40 |
| 8.4 > x ≥ 7.5 | 188 | 187 | 649 | 36 |
| 7.5 > x ≥ 6.7 | 224 | 223 | 577 | 32 |
| 6.7 > x ≥ 5.9 | 260 | 259 | 505 | 28 |
| 5.9 > x > 5.0 | 296 | 295 | 433 | 24, | and wherein, when the system bandwidth belongs to one of ranges defined in the table above, the FFT size is equal to '1024'.

4. The method of claim 1, further comprising:
   decoding a superframe header (SFH) for an informing system setting information;
   determining a parameter indicating a frequency partition (FP) configuration for a Fractional Frequency Reuse (FFR) included in the SFH;
   determining a number of frequency partitions and a size of each frequency partition (FPS) corresponding to the parameter indicating the frequency partition configuration using a second table; and
   performing subchannelization according to the number of frequency partitions and the size of each frequency partition.

5. The method of claim 4, wherein the second table defines the size of frequency partition as an expression comprising, as a variable, at least one of the number of frequency partitions and a number of Physical Resource Units ($N_{PRU}$s), wherein the $N_{PRU}$s corresponds to the number of used subcarriers.

6. The method of claim 5, wherein the size of frequency partition is determined by substituting at least one of the number of frequency partitions and the number of PRUs in the expression.

7. The method of claim 6, wherein the second table comprises a table for an FFT size of '2048' and a table for an FFT size of '1024'.

8. The method of claim 7, wherein the table for the 1+1 size of '2048' comprises a table below:

| | | Number of PRUs at $i^{th}$ frequency partition | |
|---|---|---|---|
| $FP_0:FP_1:FP_2:FP_3$ | $FPS_0$ | | $FPS_i$ (i > 0) |
| 1:0:0:0 | $N_{PRU}$ | | 0 |
| 0:1:1:1 | 0 | | $FPS_1 = N_{PRU} - 2*floor(N_{PRU}/3)$ |
| | | | $FPS_2 = floor(N_{PRU}/3)$ |
| | | | $FPS_3 = floor(N_{PRU}/3)$ |
| 1:1:1:1 | $N_{PRU} - 3*floor(N_{PRU}/4)$ | | $floor(N_{PRU}/4)$ |
| 3:1:1:1 | $N_{PRU} - 3*floor(N_{PRU}/6)$ | | $floor(N_{PRU}/6)$ |
| 5:1:1:1 | $N_{PRU} - 3*floor(N_{PRU}/8)$ | | $floor(N_{PRU}/8)$ |
| 9:1:1:1 | $N_{PRU} - 3*floor(N_{PRU}/12)$ | | $floor(N_{PRU}/12)$ |
| 9:5:5:5 | $N_{PRU} - 3*floor(N_{PRU}*5/24)$ | | $floor(N_{PRU}*5/24)$. |

9. The method of claim 7, wherein the table for the FFT size of '1024' comprises a table below:

| | | Number of PRUs at $i^{th}$ frequency partition | |
|---|---|---|---|
| $FP_0:FP_1:FP_2:FP_3$ | $FPS_0$ | | $FPS_i$(i > 0) |
| 1:0:0:0 | $N_{PRU}$ | | 0 |
| 0:1:1:1 | 0 | | $FPS_1 = N_{PRU} - 2*floor(N_{PRU}/3)$ |
| | | | $FPS_2 = floor(N_{PRU}/3)$ |
| | | | $FPS_3 = floor(N_{PRU}/3)$ |
| 1:1:1:1 | $N_{PRU} - 3*floor(N_{PRU}/4)$ | | $floor(N_{PRU}/4)$ |
| 3:1:1:1 | $N_{PRU} - 3*floor(N_{PRU}/6)$ | | $floor(N_{PRU}/6)$ |
| 5:1:1:1 | $N_{PRU} - 3*floor(N_{PRU}/8)$ | | $floor(N_{PRU}/8)$ |
| 9:5:5:5 | $N_{PRU} - 3*floor(N_{PRU}*5/24)$ | | $floor(N_{PRU}*5/24)$. |

10. A method for system bandwidth management of a Base Station (BS) in a wireless communication system, the method comprising:
    determining, by the BS, a number of guard subcarriers and a number of used subcarriers based on a Fast Fourier Transform (FFT) size and a bandwidth range among a plurality of bandwidth ranges divided between at least two channel bandwidths, using a first table; and
    setting, by the BS, an operation parameter of a modem according to the FFT size, the number of guard subcarriers, and the number of used subcarriers, wherein the first table defines the number of guard subcarriers, and the number of used subcarriers according to the plurality of bandwidth ranges and the FFT size, and wherein the plurality of bandwidth ranges are classified based on a number of sub-bands corresponding to the number of used subcarriers.

11. The method of claim 10, wherein the first table comprises a table below:

| BW region, x (MHz) | Number of guard subcarriers Left | Right | Number of used subcarriers | Number of Physical Resource Units (PRUs) |
|---|---|---|---|---|
| 20.0 > x ≥ 19.2 | 196 | 195 | 1657 | 92 |
| 19.2 > x ≥ 18.4 | 232 | 231 | 1585 | 88 |
| 18.4 > x ≥ 17.5 | 268 | 267 | 1513 | 84 |
| 17.5 > x ≥ 16.7 | 304 | 303 | 1441 | 80 |
| 16.7 > x ≥ 15.9 | 340 | 339 | 1369 | 76 |
| 15.9 > x ≥ 15.0 | 376 | 375 | 1297 | 72 |
| 15.0 > x ≥ 14.2 | 412 | 411 | 1225 | 68 |
| 14.2 > x ≥ 13.4 | 448 | 447 | 1153 | 64 |
| 13.4 > x ≥ 12.5 | 484 | 483 | 1081 | 60 |
| 12.5 > x ≥ 11.7 | 520 | 519 | 1009 | 56 |
| 11.7 > x ≥ 10.9 | 556 | 555 | 937 | 52 |
| 10.9 > x > 10.0 | 592 | 591 | 865 | 48, | and
wherein, when a system bandwidth belongs to one of ranges defined in the table above, the FFT size is equal to '2048'.

12. The method of claim 10, wherein the first table comprises a table below:

| BW region, x (MHz) | Number of guard subcarriers Left | Right | Number of used subcarriers | Number of Physical Resource Units (PRUs) |
|---|---|---|---|---|
| 10.0 > x ≥ 9.2 | 116 | 115 | 793 | 44 |
| 9.2 > x ≥ 8.4 | 152 | 151 | 721 | 40 |
| 8.4 > x ≥ 7.5 | 188 | 187 | 649 | 36 |
| 7.5 > x ≥ 6.7 | 224 | 223 | 577 | 32 |
| 6.7 > x ≥ 5.9 | 260 | 259 | 505 | 28 |
| 5.9 > x > 5.0 | 296 | 295 | 433 | 24, | and
wherein, when a system bandwidth belongs to one of ranges defined in the table above, the FFT size is equal to '1024'.

13. The method of claim 10, further comprising:
determining a number of frequency partitions and a size rate ($FP_0:FP_1:FP_2:FP_3$) of frequency partitions in order to support a Fractional Frequency Reuse (FFR);
determining a size of each frequency partition (FPS) according to the size rate using a second table; and
performing subchannelization according to the number of frequency partitions and the size of each frequency partition.

14. The method of claim 13, wherein the second table defines the size of each frequency partition as an expression comprising, as a variable, at least one of the number of frequency partitions and a number of Physical Resource Units ($N_{PRU}$s), which corresponds to the number of used subcarriers.

15. The method of claim 14, wherein the size of each frequency partition is determined by substituting at least one of the number of frequency partitions and the $N_{PRU}$s in the expression.

16. The method of claim 15, wherein the second table comprises a table for an FFT size of '2048' and a table for an FFT size of '1024'.

17. The method of claim 16, wherein the table for the FFT size of '2048' comprises a table below:

| $FP_0:FP_1:FP_2:FP_3$ | $FPS_0$ | Number of PRUs at $i^{th}$ frequency partition $FPS_i$ (i > 0) |
|---|---|---|
| 1:0:0:0 | $N_{PRU}$ | 0 |
| 0:1:1:1 | 0 | $FPS_1 = N_{PRU} - 2*floor(N_{PRU}/3)$ |
|  |  | $FPS_2 = floor(N_{PRU}/3)$ |
|  |  | $FPS_3 = floor(N_{PRU}/3)$ |
| 1:1:1:1 | $N_{PRU} - 3*floor(N_{PRU}/4)$ | $floor(N_{PRU}/4)$ |
| 3:1:1:1 | $N_{PRU} - 3*floor(N_{PRU}/6)$ | $floor(N_{PRU}/6)$ |
| 5:1:1:1 | $N_{PRU} - 3*floor(N_{PRU}/8)$ | $floor(N_{PRU}/8)$ |
| 9:1:1:1 | $N_{PRU} - 3*floor(N_{PRU}/12)$ | $floor(N_{PRU}/12)$ |
| 9:5:5:5 | $N_{PRU} - 3*floor(N_{PRU}*5/24)$ | $floor(N_{PRU}*5/24)$. |

18. The method of claim 16, wherein the table for the FFT size of '1024' comprises a table below:

| $FP_0:FP_1:FP_2:FP_3$ | $FPS_0$ | Number of PRUs at $i^{th}$ frequency partition $FPS_i$(i > 0) |
|---|---|---|
| 1:0:0:0 | $N_{PRU}$ | 0 |
| 0:1:1:1 | 0 | $FPS_1 = N_{PRU} - 2*floor(N_{PRU}/3)$ |
|  |  | $FPS_2 = floor(N_{PRU}/3)$ |
|  |  | $FPS_3 = floor(N_{PRU}/3)$ |
| 1:1:1:1 | $N_{PRU} - 3*floor(N_{PRU}/4)$ | $floor(N_{PRU}/4)$ |
| 3:1:1:1 | $N_{PRU} - 3*floor(N_{PRU}/6)$ | $floor(N_{PRU}/6)$ |
| 5:1:1:1 | $N_{PRU} - 3*floor(N_{PRU}/8)$ | $floor(N_{PRU}/8)$ |
| 9:5:5:5 | $N_{PRU} - 3*floor(N_{PRU}*5/24)$ | $floor(N_{PRU}*5/24)$. |

19. A Mobile Station (MS) apparatus in a wireless communication system, the apparatus comprising:
a detector configured to detect a primary preamble for frame synchronization, which a Base Station (BS) transmits;
a controller configured to determine a system bandwidth through the primary preamble, determine a number of guard subcarriers and a number of used subcarriers based on a Fast Fourier Transform (FFT) size and a bandwidth range among a plurality of bandwidth ranges divided between at least two channel bandwidths, and corresponding to the system bandwidth using a first table, and set an operation parameter of a modem according to the FFT size, the number of guard subcarriers, and the number of used subcarriers; and
a storage unit configured to store the first table, which defines the number of guard subcarriers, and the number of used subcarriers according to the plurality of bandwidth ranges and the FFT size, and classify the plurality of bandwidth ranges based on a number of sub-bands corresponding to the number of used subcarriers.

20. The apparatus of claim 19, wherein the first table comprises a table below:

| BW region, x (MHz) | Number of guard subcarriers Left | Right | Number of used subcarriers | Number of Physical Resource Units (PRUs) |
|---|---|---|---|---|
| 20.0 > x ≥ 19.2 | 196 | 195 | 1657 | 92 |
| 19.2 > x ≥ 18.4 | 232 | 231 | 1585 | 88 |

| BW region, x (MHz) | Number of guard subcarriers Left | Number of guard subcarriers Right | Number of used subcarriers | Number of Physical Resource Units (PRUs) |
|---|---|---|---|---|
| 18.4 > x ≥ 17.5 | 268 | 267 | 1513 | 84 |
| 17.5 > x ≥ 16.7 | 304 | 303 | 1441 | 80 |
| 16.7 > x ≥ 15.9 | 340 | 339 | 1369 | 76 |
| 15.9 > x ≥ 15.0 | 376 | 375 | 1297 | 72 |
| 15.0 > x ≥ 14.2 | 412 | 411 | 1225 | 68 |
| 14.2 > x ≥ 13.4 | 448 | 447 | 1153 | 64 |
| 13.4 > x ≥ 12.5 | 484 | 483 | 1081 | 60 |
| 12.5 > x ≥ 11.7 | 520 | 519 | 1009 | 56 |
| 11.7 > x ≥ 10.9 | 556 | 555 | 937 | 52 |
| 10.9 > x > 10.0 | 592 | 591 | 865 | 48, | and
wherein, when the system bandwidth belongs to one of ranges defined in the table above, the FFT size is equal to '2048'.

21. The apparatus of claim 19, wherein the first table comprises a table below:

| BW region, x (MHz) | Number of guard subcarriers Left | Number of guard subcarriers Right | Number of used subcarriers | Number of Physical Resource Units (PRUs) |
|---|---|---|---|---|
| 10.0 > x ≥ 9.2 | 116 | 115 | 793 | 44 |
| 9.2 > x ≥ 8.4 | 152 | 151 | 721 | 40 |
| 8.4 > x ≥ 7.5 | 188 | 187 | 649 | 36 |
| 7.5 > x ≥ 6.7 | 224 | 223 | 577 | 32 |
| 6.7 > x ≥ 5.9 | 260 | 259 | 505 | 28 |
| 5.9 > x > 5.0 | 296 | 295 | 433 | 24, | and
wherein, when the system bandwidth belongs to one of ranges defined in the table above, the FFT size is equal to '1024'.

22. The apparatus of claim 19, further comprising:
the modem configured to decode a superframe header (SFH) for informing system setting information,
wherein the controller is further configured to determine a parameter indicating a frequency partition configuration for a Fractional Frequency Reuse (FFR) included in the superframe header, determine the number of frequency partitions (FPs) and the size of each frequency partition (FPS) corresponding to the parameter using a second table, and perform subchannelization according to the number of frequency partitions and the size of each frequency partition.

23. The apparatus of claim 22, wherein the second table defines the size of frequency partition as an expression comprising, as a variable, at least one of the number of frequency partitions and a number of Physical Resource Units ($N_{PRU}$s), which corresponds to the number of used subcarriers.

24. The apparatus of claim 23, wherein the size of frequency partition is determined by substituting at least one of the number of frequency partitions and the $N_{PRU}$s in the expression.

25. The apparatus of claim 24, wherein the second table comprises a table for an FFT size of '2048' and a table for an FFT size of '1024'.

26. The apparatus of claim 25, wherein the table for the FFT size of '2048' comprises a table below:

| $FP_0:FP_1:FP_2:FP_3$ | Number of PRUs at $i^{th}$ frequency partition | |
|---|---|---|
| | $FPS_0$ | $FPS_i (i > 0)$ |
| 1:0:0:0 | $N_{PRU}$ | 0 |
| 0:1:1:1 | 0 | $FPS_1 = N_{PRU} - 2*\text{floor}(N_{PRU}/3)$ |
| | | $FPS_2 = \text{floor}(N_{PRU}/3)$ |
| | | $FPS_3 = \text{floor}(N_{PRU}/3)$ |
| 1:1:1:1 | $N_{PRU} - 3*\text{floor}(N_{PRU}/4)$ | $\text{floor}(N_{PRU}/4)$ |
| 3:1:1:1 | $N_{PRU} - 3*\text{floor}(N_{PRU}/6)$ | $\text{floor}(N_{PRU}/6)$ |
| 5:1:1:1 | $N_{PRU} - 3*\text{floor}(N_{PRU}/8)$ | $\text{floor}(N_{PRU}/8)$ |
| 9:1:1:1 | $N_{PRU} - 3*\text{floor}(N_{PRU}/12)$ | $\text{floor}(N_{PRU}/12)$ |
| 9:5:5:5 | $N_{PRU} - 3*\text{floor}(N_{PRU}*5/24)$ | $\text{floor}(N_{PRU}*5/24)$. |

27. The apparatus of claim 25, wherein the table for the FFT size of '1024' comprises a table below:

| $FP_0:FP_1:FP_2:FP_3$ | Number of PRUs at $i^{th}$ frequency partition | |
|---|---|---|
| | $FPS_0$ | $FPS_i(i > 0)$ |
| 1:0:0:0 | $N_{PRU}$ | 0 |
| 0:1:1:1 | 0 | $FPS_1 = N_{PRU} - 2*\text{floor}(N_{PRU}/3)$ |
| | | $FPS_2 = \text{floor}(N_{PRU}/3)$ |
| | | $FPS_3 = \text{floor}(N_{PRU}/3)$ |
| 1:1:1:1 | $N_{PRU} - 3*\text{floor}(N_{PRU}/4)$ | $\text{floor}(N_{PRU}/4)$ |
| 3:1:1:1 | $N_{PRU} - 3*\text{floor}(N_{PRU}/6)$ | $\text{floor}(N_{PRU}/6)$ |
| 5:1:1:1 | $N_{PRU} - 3*\text{floor}(N_{PRU}/8)$ | $\text{floor}(N_{PRU}/8)$ |
| 9:5:5:5 | $N_{PRU} - 3*\text{floor}(N_{PRU}*5/24)$ | $\text{floor}(N_{PRU}*5/24)$. |

28. A Base Station (BS) apparatus in a wireless communication system, the apparatus comprising:
a controller configured to determine a number of guard subcarriers and a number of used subcarriers based on a Fast Fourier Transform (FFT) size and bandwidth range among a plurality of bandwidth ranges divided between at least two channel bandwidths, using a first table, and set an operation parameter of a modem according to the FFT size, the number of guard subcarriers, and the number of used subcarriers; and
a storage unit configured to store the first table, which defines the number of guard subcarriers, and the number of used subcarriers according to the plurality of bandwidth ranges and the FFT size, and classifies the plurality of bandwidth ranges based on a number of sub-bands corresponding to the number of used subcarriers.

29. The apparatus of claim 28, wherein the first table comprises a table below:

| BW region, x (MHz) | Number of guard subcarriers Left | Number of guard subcarriers Right | Number of used subcarriers | Number of Physical Resource Units (PRUs) |
|---|---|---|---|---|
| 20.0 > x ≥ 19.2 | 196 | 195 | 1657 | 92 |
| 19.2 > x ≥ 18.4 | 232 | 231 | 1585 | 88 |
| 18.4 > x ≥ 17.5 | 268 | 267 | 1513 | 84 |
| 17.5 > x ≥ 16.7 | 304 | 303 | 1441 | 80 |
| 16.7 > x ≥ 15.9 | 340 | 339 | 1369 | 76 |
| 15.9 > x ≥ 15.0 | 376 | 375 | 1297 | 72 |
| 15.0 > x ≥ 14.2 | 412 | 411 | 1225 | 68 |
| 14.2 > x ≥ 13.4 | 448 | 447 | 1153 | 64 |
| 13.4 > x ≥ 12.5 | 484 | 483 | 1081 | 60 |
| 12.5 > x ≥ 11.7 | 520 | 519 | 1009 | 56 |
| 11.7 > x ≥ 10.9 | 556 | 555 | 937 | 52 |
| 10.9 > x > 10.0 | 592 | 591 | 865 | 48, | and wherein, when a system bandwidth belongs to one of ranges defined in the table above, the FFT size is equal to '2048'.

30. The apparatus of claim 28, wherein the first table comprises a table below:

| BW region, x (MHz) | Number of guard subcarriers Left | Number of guard subcarriers Right | Number of used subcarriers | Number of Physical Resource Units (PRUs) |
|---|---|---|---|---|
| 10.0 > x ≥ 9.2 | 116 | 115 | 793 | 44 |
| 9.2 > x ≥ 8.4 | 152 | 151 | 721 | 40 |
| 8.4 > x ≥ 7.5 | 188 | 187 | 649 | 36 |
| 7.5 > x ≥ 6.7 | 224 | 223 | 577 | 32 |
| 6.7 > x ≥ 5.9 | 260 | 259 | 505 | 28 |
| 5.9 > x > 5.0 | 296 | 295 | 433 | 24, | and wherein, when a system bandwidth belongs to one of ranges defined in the table above, the FFT size is equal to '1024'.

31. The apparatus of claim 28, wherein the controller is further configured to determine a number of frequency partitions (FPs) and a size rate of frequency partitions ($FP_0:FP_1:FP_2:FP_3$) in order to support a Fractional Frequency Reuse (FFR), determine a size of each frequency partition (FPS) according to the size rate of frequency partitions using a second table, and perform subchannelization according to the number of frequency partitions and the size of each frequency partition.

32. The apparatus of claim 31, wherein the second table defines the size of each frequency partition as an expression comprising, as a variable, at least one of the number of frequency partitions and a number of Physical Resource Units ($N_{PRU}$s), which corresponds to the number of used subcarriers.

33. The apparatus of claim 32, wherein the size of each frequency partition is determined by substituting at least one of the number of frequency partitions and the $N_{PRU}$s in the expression.

34. The apparatus of claim 33, wherein the second table comprises a table for an FFT size of '2048' and a table for an FFT size of '1024'.

35. The apparatus of claim 34, wherein the table for the FFT size of '2048' comprises a table below:

| $FP_0:FP_1:FP_2:FP_3$ | Number of PRUs at $i^{th}$ frequency partition $FPS_0$ | $FPS_i (i > 0)$ |
|---|---|---|
| 1:0:0:0 | $N_{PRU}$ | 0 |
| 0:1:1:1 | 0 | $FPS_1 = N_{PRU} - 2*floor(N_{PRU}/3)$ $FPS_2 = floor(N_{PRU}/3)$ $FPS_3 = floor(N_{PRU}/3)$ |
| 1:1:1:1 | $N_{PRU} - 3*floor(N_{PRU}/4)$ | $floor(N_{PRU}/4)$ |
| 3:1:1:1 | $N_{PRU} - 3*floor(N_{PRU}/6)$ | $floor(N_{PRU}/6)$ |
| 5:1:1:1 | $N_{PRU} - 3*floor(N_{PRU}/8)$ | $floor(N_{PRU}/8)$ |
| 9:1:1:1 | $N_{PRU} - 3*floor(N_{PRU}/12)$ | $floor(N_{PRU}/12)$ |
| 9:5:5:5 | $N_{PRU} - 3*floor(N_{PRU}*5/24)$ | $floor(N_{PRU}*5/24)$. |

36. The apparatus of claim 34, wherein the table for the FFT size of '1024' comprises a table below:

| $FP_0:FP_1:FP_2:FP_3$ | Number of PRUs at $i^{th}$ frequency partition $FPS_0$ | $FPS_i (i > 0)$ |
|---|---|---|
| 1:0:0:0 | $N_{PRU}$ | 0 |
| 0:1:1:1 | 0 | $FPS_1 = N_{PRU} - 2*floor(N_{PRU}/3)$ $FPS_2 = floor(N_{PRU}/3)$ $FPS_3 = floor(N_{PRU}/3)$ |
| 1:1:1:1 | $N_{PRU} - 3*floor(N_{PRU}/4)$ | $floor(N_{PRU}/4)$ |
| 3:1:1:1 | $N_{PRU} - 3*floor(N_{PRU}/6)$ | $floor(N_{PRU}/6)$ |
| 5:1:1:1 | $N_{PRU} - 3*floor(N_{PRU}/8)$ | $floor(N_{PRU}/8)$ |
| 9:5:5:5 | $N_{PRU} - 3*floor(N_{PRU}*5/24)$ | $floor(N_{PRU}*5/24)$. |

* * * * *